United States Patent
Mercuri

Patent Number: 6,143,218
Date of Patent: Nov. 7, 2000

[54] METHOD OF FORMING A FLEXIBLE GRAPHITE COMPOSITE SHEET

[75] Inventor: Robert Angelo Mercuri, Seven Hills, Ohio

[73] Assignee: UCAR Graph-Tech Inc., Nashville, Tenn.

[21] Appl. No.: 09/369,974

[22] Filed: Aug. 6, 1999

Related U.S. Application Data

[62] Division of application No. 08/819,744, Mar. 18, 1997, Pat. No. 5,985,452.

[51] Int. Cl.⁷ .................................................. C04B 35/52
[52] U.S. Cl. ............................ 264/51; 264/42; 264/80; 264/105; 264/122; 264/321; 423/448
[58] Field of Search ............................ 264/51, 122, 80, 264/105, 42, 321; 423/448

[56] References Cited

U.S. PATENT DOCUMENTS

| | | |
|---|---|---|
| 3,404,061 | 10/1968 | Shane et al. |
| 4,102,960 | 7/1978 | Borkowski ............................... 264/42 |
| 4,199,628 | 4/1980 | Caines ........................................ 428/36 |
| 4,216,266 | 8/1980 | Hirschvogel et al. ................... 428/408 |
| 4,565,649 | 1/1986 | Vogel ....................................... 423/448 |
| 4,749,514 | 6/1988 | Murakami et al. ...................... 423/460 |
| 4,895,713 | 1/1990 | Greinke et al. .......................... 423/448 |
| 4,915,925 | 4/1990 | Chung ...................................... 423/448 |
| 5,149,518 | 9/1992 | Mercuri et al. .......................... 423/448 |
| 5,176,863 | 1/1993 | Howard ................................... 264/113 |
| 5,225,379 | 7/1993 | Howard ................................... 423/448 |
| 5,330,680 | 7/1994 | Sakawaki et al. ....................... 423/448 |
| 5,376,450 | 12/1994 | Greinke et al. .......................... 423/448 |
| 5,494,506 | 2/1996 | Ford et al. ................................ 55/502 |
| 5,531,454 | 7/1996 | Borneby .................................... 277/26 |
| 5,582,781 | 12/1996 | Hayward ................................. 423/448 |
| 5,698,088 | 12/1997 | Kang et al. .............................. 423/448 |
| 5,846,459 | 12/1998 | Mercuri ................................... 423/448 |
| 5,985,452 | 11/1999 | Mercuri ................................... 428/408 |

*Primary Examiner*—Allan R. Kuhns

[57] ABSTRACT

Flexible graphite sheet is made by compressing a mixture of fine particle of intercalated, exfoliated, expanded natural graphite with fine particles of intercalated, unexpanded, expandable particles of natural graphite, the unexpanded particles being more finely sized than the expanded particles. The resulting sheet of flexible graphite exhibits improved fire retardant and sealability properties.

1 Claim, 3 Drawing Sheets

6,143,218

METHOD OF FORMING A FLEXIBLE GRAPHITE COMPOSITE SHEET

This is a divisional application of Ser. No. 08/819,744, filed Mar. 18, 1997, now U.S. Pat. No. 5,985,452.

FIELD OF THE INVENTION

This invention relates to flexible graphite sheet which includes a heat expandable component to enhance fire retardance and the sealability of gaskets made from such sheet.

BACKGROUND OF THE INVENTION

Flexible graphite is commercially used in sheet form for the manufacture of gaskets. The flexible graphite sheet can be in the form of compressed exfoliated, expanded particles of graphite, or, in the form of a compressed mixture of exfoliated, expanded particles of graphite and unexfoliated, intercalated, unexpanded, expandable particles of graphite. This latter embodiment has the advantage of undergoing expansion while in place as a gasket upon exposure to high temperature so that sealing is enhanced. Material of this type has also been proposed for use as a fire retardant covering for walls and other flammable substitutes since expansion of the intercalated expandable graphite upon exposure to flame acts as a fire retardant. For commercial reasons it has become advantageous to use increasingly smaller sized natural graphite particles, i.e. small sized flake as the starting material in making such sheet material. With the use of such finer material the expansion and fire retardation effect of the sheet has become uneven largely on account of the tendency of the exfoliated expanded particles and the unexpanded intercalated particles to segregate and result in a non-homogeneous product with irregular sealing and fire-retardant behavior. This problem is avoided in the flexible graphite sheet material of the present invention by the use of differently sized batches of natural graphite flake as starting materials for the respective exfoliated and expandable components of the flexible graphite sheet to be used in the manufacture of gaskets or fire retardant substrate coverings.

DETAILED DESCRIPTION OF THE INVENTION

Figure 1:
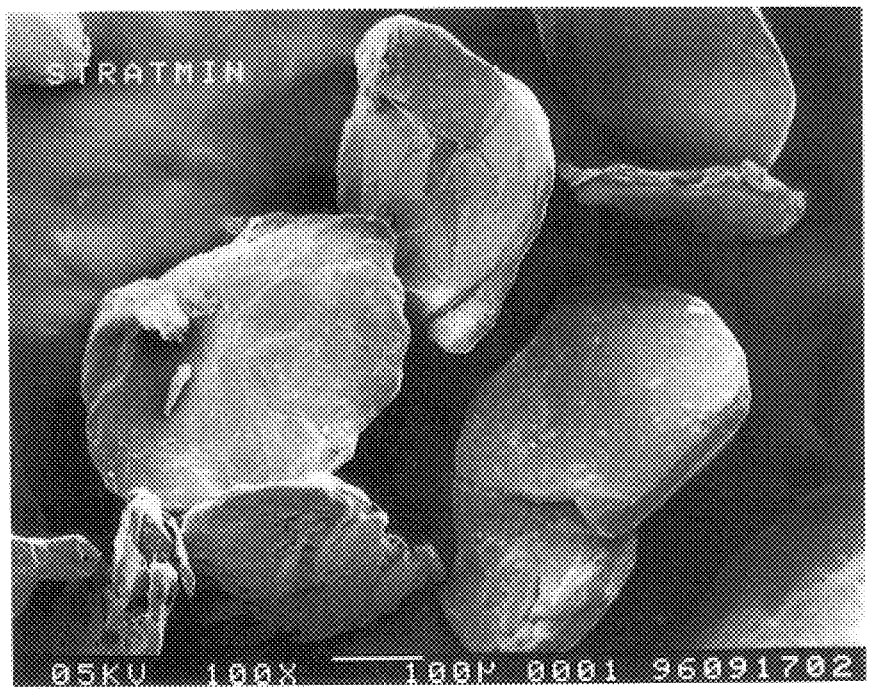
FIG. 1 is a scanning view electron microscope (SEM) at an original magnification of 100× showing natural graphite flake sized in the range of 20×50 mesh.

Naturally occurring graphite is a crystalline form of carbon comprising atoms bonded in flat layered planes with weaker bonds between the planes. By treating particles of natural graphite with an intercalant of e.g., a solution of sulfuric and nitric acid, the crystal structure of the graphite reacts to form a compound of graphite and the intercalant. Grinding, milling and other mechanical treatment of naturally occurring graphite can change the crystal orientation of graphite and the effectiveness of the intercalant. The treated intercalated particles of graphite are known as particles of "heat expandable graphite" and are commercially available. Upon exposure to high temperature, the particles of intercalated graphite undergo intumescence and expand in dimension as much as 80 or more times its original volume in an accordion-like fashion in the c-direction, i.e. in the direction perpendicular to the crystalline planes of the graphite. The exfoliated, i.e. expanded graphite particles are vermiform in appearance, and are therefore commonly referred to as worms.

A common method for making expandable graphite particles is described by Shane et al in U.S. Pat. No. 3,404,061 the disclosure of which is incorporated herein by reference. In the typical practice of this method, natural graphite flakes are intercalated by dispersing the flakes in a solution containing an oxidizing agent e.g., a mixture of nitric and sulfuric acid. The intercalation solution contains oxidizing and other intercalating agents known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid.

A preferred intercalating agent is a solution of a mixture of sulfuric acid, or sulfuric acid and phosphoric acid, and an oxidizing agent, i.e. nitric acid, perchloric acid, chromic acid, potassium permanganate, hydrogen peroxide, iodic or periodic acids, or the like. Although less preferred, the intercalation solutions may contain metal halides such as ferric chloride, and ferric chloride mixed with sulfuric acid, or a halide, such as bromine as a solution of bromine and sulfuric acid or bromine in an organic solvent.

After the flakes are intercalated excess solution is drained from the flakes and after washing with water, the intercalated graphite flakes are dried and are expandable upon exposure to a flame for only a few seconds. Commercially available expandable graphite flake product is available from UCAR Carbon Company Inc.

The thus treated particles of graphite are hereafter referred to as "particles of intercalated graphite". Upon exposure to high temperature, the particles of intercalated graphite expand in dimension as much as 80 to 1000 or more times its original volume in an accordion-like fashion in the c-direction, i.e. in the direction perpendicular to the crystalline planes of the graphite. The exfoliated graphite particles are vermiform in appearance, and are therefore commonly referred to as worms. The worms may be compressed together into flexible sheets which, unlike the original graphite flakes, can be formed and cut into various shapes.

It is known to use a compressed sheet of combined exfoliated flexible graphite particles and unexfoliated, intercalated graphite particles in a gasket shape in a contacting gasket relationship and for use as a fire proof floor or wall covering. When used as a gasket, the gasket will expand upon contact with high temperature and also provide a gas tight fire proof seal. When used as a fire retardant wall covering the expansion of the intercalated graphite component on exposure to flame acts to extinguish the flame.

Figure 2:
FIG. 2 is a scanning electron microscope (SEM) view at an original magnification of 100× showing natural graphite flake sized 50×80 mesh.
Figure 3:
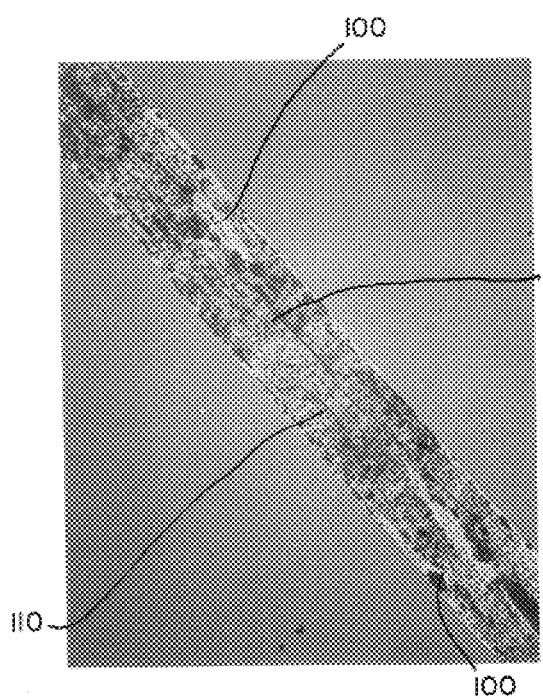
FIG. 3 and FIG. 6 are scanning electron microscope (SEM) views at an original magnification of 35× showing a flexible graphite sheet in accordance with the present invention.

In a particular embodiment of the present invention, a first batch of relatively fine natural graphite flake particles, i.e.

naturally occurring graphite flake, as shown in FIG. 1 (original magnification 100×), at least 80% by weight sized 20×50 mesh (through 20 mesh on 50 mesh), are treated by dispersing the naturally occurring flakes in an intercalating solution such as above-described. After the flakes of the first batch are intercalated, excess solution is drained from the flakes which are then washed with water and dried. The dried flakes of the first batch are exposed to a flame for only a few seconds and the intercalated flake particles expand, i.e. exfoliate, into vermicular, worm-like particles which are about 80 to 1000 times the volume of the initial dried intercalated flakes. A second batch of smaller sized natural graphite flakes as shown in FIG. 2 (original magnification 100×), sized at least 80% by weight 50 by 80 mesh (through 50 mesh on 80 mesh), is treated with an intercalating solution in the same manner as the first batch and similarly water-washed and dried. These unexfoliated intercalated natural graphite flakes, at least 80% by weight 50 by 80 mesh, are mixed and blended with the exfoliated particles of the first batch to provide from about 5% to 25% by weight of unexfoliated intercalated natural graphite flake in the mixture. The unexfoliated intercalated natural graphite flake particles are readily mixed with the high volume exfoliated, vermicular particles to provide a substantially uniform blend of unexfoliated, unexpanded flake and exfoliated, expanded vermicular particles. This can be achieved, for example, by spreading the finer, unexfoliated natural graphite particles over a bed of exfoliated natural graphite particles which are positioned on a vibrating table. The intercalated, unexfoliated particles of natural graphite are of a size which are substantially uniformly entrapped and surrounded in a contiguous matrix of exfoliated natural graphite particles which when roll-pressed, results in a flexible graphite sheet in which the intercalated, unexfoliated natural graphite particles 100 are substantially uniformly "locked" by compression in a matrix 110 of compressed exfoliated natural graphite as shown in FIG. 3.

The use of finer than 80 mesh sized unexfoliated intercalated natural graphite flake has been found to result in a concentration of such particles near the surface of the bed of large exfoliated graphite particles. The finer particles are thus not uniformly entrapped in the mass of larger exfoliated particles resulting in a non-uniform final product material. The use of finer than a 80 mesh sized unexfoliated, intercalated graphite flakes also has been found to result in a flake with excess retained water content which results in a sheet which loses expansion capability and thus has a limited shelf life.

Larger sized, e.g. 30×50 mesh intercalated, unexfoliated natural graphite particles tend to agglomerate and result in non-uniformity in the mixture and the formation of disruptive channels during expansion when in use as a gasket or fire retardant covering.

EXAMPLE I

Prior Art

Natural graphite flake, sized 80% by weight 20×50 mesh, (FIG. 1) was treated in a mixture of sulfuric (90 wt. %) and nitric acid (10 wt. %). The thus treated intercalated natural occurring flake was water washed and dried to about 1% by weight water. A portion of the treated, intercalated heat expandable natural graphite flake was introduced into a furnace at 2500° F. to obtain rapid expansion of the flake into one pound of vermicular, worm shaped particles having a volume of about 325 times that of the unexpanded intercalated flake. Treated, unexpanded intercalated natural graphite flake, in the amount of 0.18 pounds, was blended with the worm shaped, heat expanded graphite particles to provide a blended mixture containing about 15% by weight of unexpanded, intercalated natural graphite flake sized 20 by 50 mesh.

Figure 4:
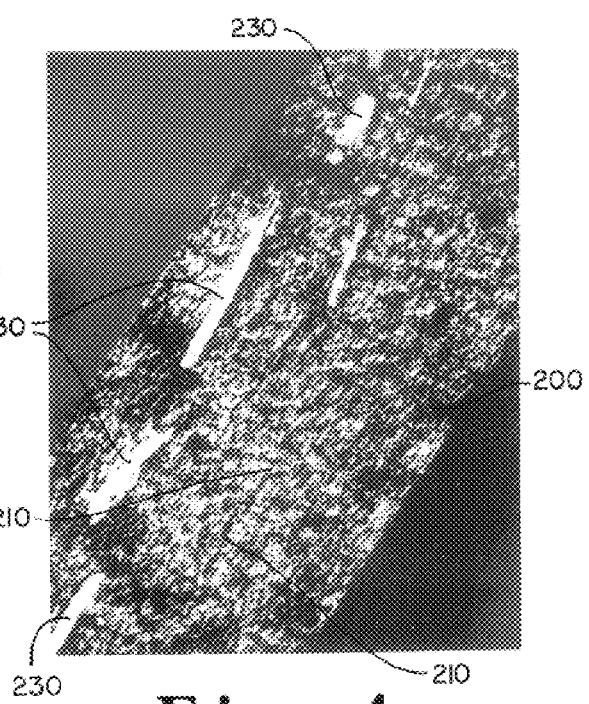
FIGS. 4 and 5 are scanning electron microscope (SEM) views at an original magnification of 35× showing prior art flexible graphite sheet.

The blended mixture of worm shaped heat expanded, intercalated graphite flake with unexpanded graphite flake was rolled into a sheet about 0.060 inch thick and 12 inches in width. Samples of the sheet 0.060 inch thick shown in cross-section at 35× original magnification in FIG. 4 show the voids 200 and cracks 210 caused by relatively large flakes and the non-uniform distribution of the expandable, intercalated flakes 230.

Large 8.5×11 inch sheets of Example 1 were heated in an oven to 250°, 300° and 400° C. The variation in thickness and density across a cross-section of the sheets is given in the Table below:

| Heating Temp. (° C.) | Variation in Expansion (%) | Variation in Density (#/Ft.$^2$) |
| --- | --- | --- |
| 2500 | 0–100 | 70–35 |
| 3000 | 100–500 | 35–4 |
| 4000 | 100–800 | 35–3 |

Samples of the sheet were cut to ½ ID×1¾" OD by 0.060" thickness and heated in a oven set at the same temperatures.

The results of these tests showed that at 400° C. the samples are much more expanded on the one side vs. the other, i.e. approximately 2 times as much variation in expansion.

EXAMPLE II

Figure 5:
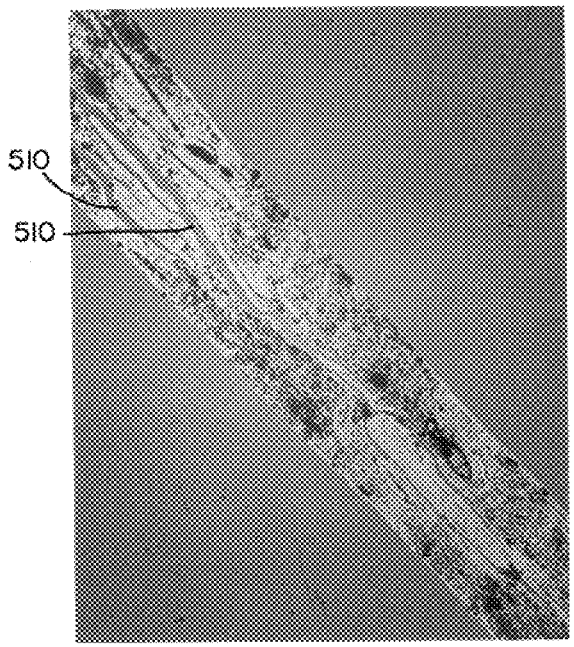

The procedure of Example I was followed except that the thickness of the bed was reduced and attempts were made to roll the material into sheet about 0.020" thick. This effort was not successful as shown in FIG. 5, due to the agglomeration and the concentration of material towards one side of the bed the material could not be calendared into a continuous sheet of uniform thickness as illustrated by voids 510.

EXAMPLE III

This Invention

A first batch of natural graphite flake, sized 80% by weight 20×50 mesh, (FIG. 1) was treated in a mixture of sulfuric (90 wt. %) and nitric acid (10 wt. %). The thus treated, intercalated natural graphite flake was water washed and dried to about 1% by weight water, a portion of the intercalated heat expandable natural graphite flake was introduced into a furnace at 2500° C. to obtain rapid expansion of the flake into one pound of vermicular, worm shaped particles having a volume of about 325 times that of the unexpanded intercalated flake.

A second batch of smaller sized natural graphite flake, sized 80% by weight 50×80 mesh (FIG. 2) was treated in a mixture of sulfuric and nitric acid and water washed in the same manner as first batch of larger sized natural graphite to obtain intercalated, unexpanded heat expandable natural graphite flake.

A portion, consisting of 0.18 pounds of the intercalated, unexpanded, heat expandable natural graphite flake of the smaller particle sized second batch material was blended with one (1) pound of the worm shaped heat expanded particles of the first batch to provide a blended mixture containing about 15% by weight of unexpanded, intercalated natural graphite flake.

The mixture of worm shaped heat expanded natural graphite particles and unexpanded, intercalated natural graphite flake was rolled into a sheet about 0.050 inch thick and 24 inches in width.

Samples (8.5 inch×11 inch) of the sheet from this Example III were tested for expansion at 250°, 300° and 400° C.; the reduced variation, as compared to Example I, in expansion and density are shown in the following Table:

| Heating Temp. (° C.) | Variation in Expansion (%) | Variation in Density (#/Ft.$^2$) |
|---|---|---|
| 250° | 75–125 | 40–30 |
| 300° | 400–600 | 14–10 |
| 400° | 650–900 | 9–7 |

*Mesh sizes used herein are United States screen series.

EXAMPLE IV

This Invention

Figure 6:
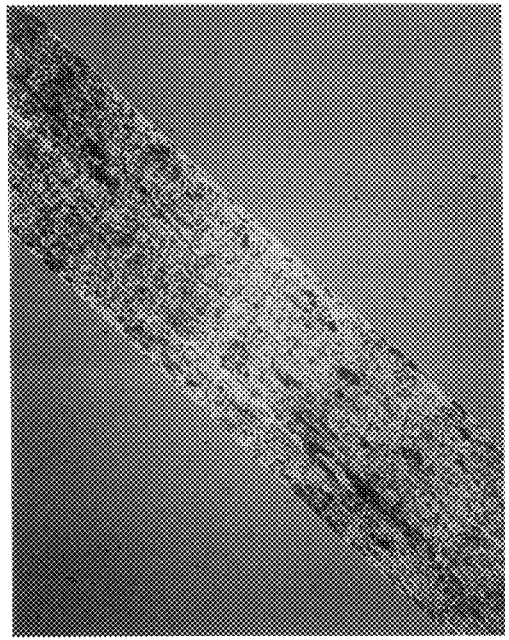

The material of Example III was used to roll the mixture of flakes into sheets about 0.015 inch and 0.020 inch thick, respectively. Both attempts were successful, resulting in satisfactory continuous sheet, thus demonstrating the importance of using the particle size of the present invention. A sample of the 0.015 inch thickness sheet is shown in cross-section, at 35× original magnification, in FIG. 6. The sheet of FIG. 7, in accordance with the present invention is of uniform density and thickness and contains no unacceptable voids or fissures.

EXAMPLE V

A test apparatus was used to measure the ability of various graphite sheets to seal a fixture and thus resist nitrogen flow. Three channels, each containing the identical shape and weight of material of exfoliated sheet and samples of Example 1 and Example 3 were heated to 400° C. After heating, the resistance to nitrogen flow of each of the sheets was measured at the same conditions of temperature and pressure. The results are shown below:

| Type of Material | Relative Resistance to Flow |
|---|---|
| 100% Exfoliated Graphite Sheet | 0.0002 |
| Example 1 (Prior Art) | 0.0007 |
| Example 3 (Present Invention) | 10.000 |

What is claimed is:

1. Method for making flexible graphite sheet comprising:

(i) providing a first batch of natural graphite flake sized at least 80% by weight 20×50 mesh;

(ii) treating said first batch of natural graphite flake with an intercalating solution to obtain heat expandable, intercalated graphite flake;

(iii) exposing intercalated natural graphite flake of step (ii) to an elevated temperature to exfoliate said intercalated natural graphite flake into expanded vermicular worm shaped particles of graphite;

(iv) providing a second batch of natural graphite flake sized at least 80% by weight 50×80 mesh;

(v) treating said second batch of natural graphite flake with an intercalating solution to obtain unexpanded heat expandable intercalated graphite flakes sized 50×80 mesh;

(vi) mixing expanded vermicular worm shaped particles of natural graphite from step (iii) with, unexpanded heat expandable intercalated natural graphite flake from step (v) to provide a blended mixture comprising from about 5 to 25% by weight of said unexpanded, heat expandable intercalated natural graphite flake; and (vii) passing the blended mixture of step (vi) through pressure rolls to form a compressed sheet formed of said blended mixture.

* * * * *

UNITED STATES PATENT AND TRADEMARK OFFICE
CERTIFICATE OF CORRECTION

PATENT NO. : 6,143,218
DATED : November 7, 2000
INVENTOR(S) : R.A. Mercuri

It is certified that error appears in the above-identified patent and that said Letters Patent is hereby corrected as shown below:

<u>Title page,</u>
Item [54], in the title, "METHOD OF FORMING A FLEXIBLE GRAPHITE COMPOSITE SHEET" should be -- FLEXIBLE GRAPHITE COMPOSITE SHEET AND METHOD --;

<u>Column 4,</u>
Line 23, under the heading "Heating Temp. (°C.)", change "2500" to -- 250° --;
Line 24, change "3000" to -- 350° --; and
Line 25, change "4000" to -- 400° --.

Signed and Sealed this

Twenty-sixth Day of March, 2002

*Attest:*

JAMES E. ROGAN
*Attesting Officer*  *Director of the United States Patent and Trademark Office*